Figure 1:
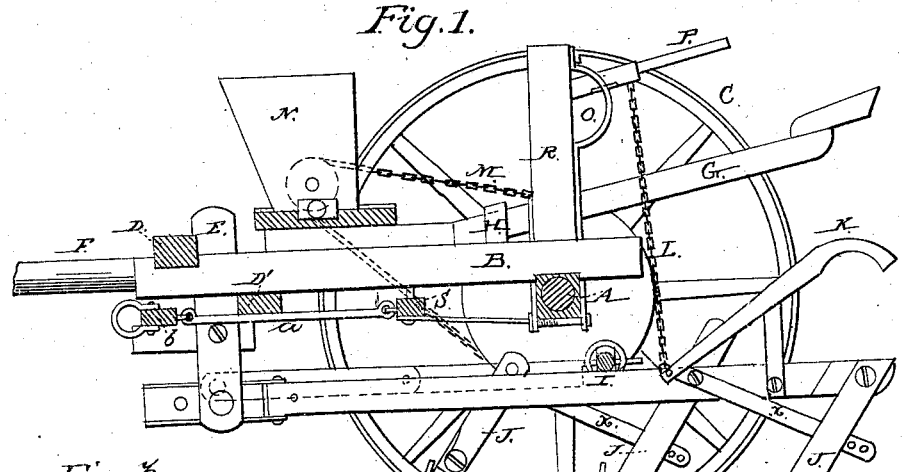
Figure 3:
Figure 2:
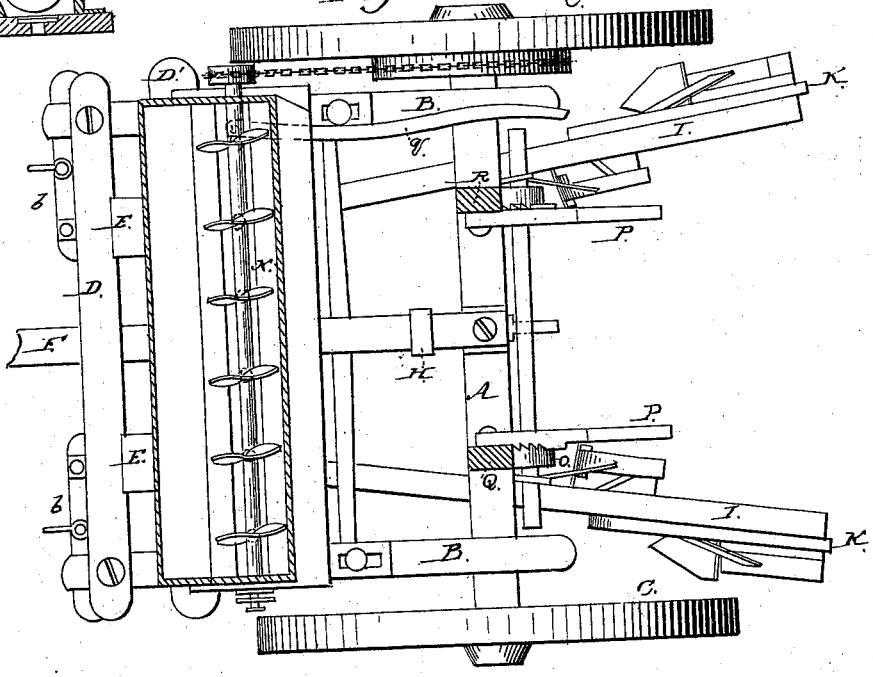

A. S. MARKHAM.
Wheel-Cultivator.

No. 70,345. Patented Oct. 29. 1867.

United States Patent Office.

A. S. MARKHAM, OF BUSHNELL, ILLINOIS.

Letters Patent No. 70,345, dated October 29, 1867.

---

IMPROVEMENT IN COMBINED CULTIVATOR AND SEEDER.

---

The Schedule referred to in these Letters Patent and making part of the same.

---

TO ALL WHOM IT MAY CONCERN:

Be it known that I, A. S. MARKHAM, of Bushnell, in the county of McDonough, and in the State of Illinois, have invented certain new and useful Improvements in Combined Cultivator and Seed-Sower; and do hereby declare that the following is a full, clear, and exact description thereof, reference being had to the accompanying drawings, and to the letters of reference marked thereon.

In the annexed drawings, making part of this specification, A represents the axle of the machine, C C the wheels upon which it is supported, and B B the two side pieces of the frame, which are firmly secured to the axle at their rear ends. D D' represent two cross-pieces of the frame, which lie across the forward ends of the pieces B B, one beneath and a little in the rear of the other, which lies upon top of said pieces B B. E E represent two pendent bars, the upper ends of which are secured between the cross-pieces D D', and the lower ends of which are slotted to receive them between the forward ends of the beams I I, which carry the cultivator or plough-teeth. The tongue F of the machine is situated midway between the two pendents, and these pendents are capable of adjustment to or from the tongue, so as to throw the beams with their plough-points to or from the corn or other grain to be cultivated. The beams are jointed at their forward ends, so as to be capable of both a lateral or vertical adjustment at their rear ends while the machine is in motion. The forward ends of the beams may be raised or lowered in the slots of the pendents, so as to regulate the set of the plough-points. The rear ends of the beams are provided with chains or cords L, which pass up and secure to the levers P P. The inner ends of levers P are pivoted to the standards R R, which are erected upon the axle, their outer ends being free. These levers are provided with metallic plates upon their under side, which catch into the teeth of the curved ratchet-bars O for the purpose of stationing them in any desired position. The ratchet-bars are secured to the standards R R. By lifting the outer ends of the levers P P the rear ends of the beams are elevated. G represents a bar, upon the rear end of which is secured the driver's seat. This bar has its forward end resting upon the tongue, near the axle, and is confined to it by means of the metallic loops H. A wedge is passed under this bar, and between it and the beam, for the purpose of raising or lowering the driver's seat. K K represent handles, which are secured to the beams at their rear ends, and which are situated on each side of the driver's seat, so that the beams can be readily adjusted and regulated by the driver while in his seat. A bar, S, is pivoted on the under side of the tongue, and braced back at its pivot to the axle, and rods $a\ a$ connect the ends of this bar to the short or half whiffle-trees 6 6 at their outer ends. These half whiffle-trees are provided with clevises for hitching to, and are pivoted at their inner ends to short bars which are secured in the slots of the pendents E, said bars being adjustable higher or lower in said slots. The draught-bar S oscillates, and so do the whiffle-trees 6 6, when the machine is being drawn forward. The draught may be regulated by the use of the clevis, and also by raising and lowering the whiffle-trees and the bar S. N represents a seed-hopper, which is secured upon the forward part of the frame. This hopper is provided with a perforated bottom, with suitable slides, and also with a seed-distributing or equalizing cylinder within it. This cylinder is provided on one end with a pulley, and a cord or chain passes from said pulley to a pulley secured on the inner face of one of the wheels C. The seed-slide of the hopper is regulated from the driver's seat by means of lever $q$. The shanks J J, which carry the plough-points, are braced to the beams by the bars $x\ x$, which are graduated with holes for setting said shanks in any desired position.

What I claim as new, and desire to secure by Letters Patent, is—

In connection with the frame of a wheeled cultivator the pendents E E, beams I, with their plough-shanks J J, chains or cords L, and levers P, with the bar S, rods $a\ a$, and whiffle-trees 6 6, arranged and used as and for the purpose specified.

In testimony that I claim the foregoing I have hereunto set my hand this 3d day of August, 1867.

A. S. MARKHAM.

Witnesses:
   J. T. SANDERS,
   PARDON WOOLLEY.